United States Patent
Tanimura et al.

(10) Patent No.: US 7,574,070 B2
(45) Date of Patent: Aug. 11, 2009

(54) CORRECTION OF SUBJECT AREA DETECTION INFORMATION, AND IMAGE COMBINING APPARATUS AND METHOD USING THE CORRECTION

(75) Inventors: Kaname Tanimura, Tokyo (JP);
Toshikazu Ohshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 584 days.

(21) Appl. No.: 10/948,143

(22) Filed: Sep. 24, 2004

(65) Prior Publication Data
US 2005/0069223 A1 Mar. 31, 2005

(30) Foreign Application Priority Data

Sep. 30, 2003 (JP) .............................. 2003-341624
Feb. 13, 2004 (JP) .............................. 2004-037188

(51) Int. Cl.
*G06K 9/36* (2006.01)
(52) U.S. Cl. ....................................... 382/284; 345/632
(58) Field of Classification Search ................. 382/163, 382/164, 171; 348/586, 591; 345/629, 632, 345/633, 634
See application file for complete search history.

(56) References Cited

U.S. PATENT DOCUMENTS

| | | | | |
|---|---|---|---|---|
| 5,469,536 A | * | 11/1995 | Blank | 345/594 |
| 5,953,076 A | * | 9/1999 | Astle et al. | 348/584 |
| 6,166,744 A | * | 12/2000 | Jaszlics et al. | 345/629 |
| 6,288,703 B1 | * | 9/2001 | Berman et al. | 345/600 |
| 6,522,312 B2 | | 2/2003 | Ohshima et al. | 345/8 |
| 6,544,312 B2 | | 4/2003 | Müllinger et al. | 55/434 |
| 6,597,406 B2 | * | 7/2003 | Gloudemans et al. | 348/587 |
| 6,822,643 B2 | | 11/2004 | Matsui et al. | 345/204 |
| 6,909,438 B1 | * | 6/2005 | White et al. | 345/629 |
| 6,945,869 B2 | * | 9/2005 | Kim et al. | 463/2 |
| 7,206,434 B2 | * | 4/2007 | Overton et al. | 382/103 |
| 7,230,653 B1 | * | 6/2007 | Overton et al. | 348/584 |
| 7,254,268 B2 | * | 8/2007 | Zhao et al. | 382/190 |
| 2003/0185416 A1 | | 10/2003 | Sugiura | 381/424 |

(Continued)

FOREIGN PATENT DOCUMENTS

JP 9-181972 7/1997

(Continued)

OTHER PUBLICATIONS

Japanese Official Communication dated Mar. 23, 2009, regarding Application No. 2004-037188.

(Continued)

*Primary Examiner*—Bhavesh M Mehta
*Assistant Examiner*—Sean Motsinger
(74) *Attorney, Agent, or Firm*—Fitzpatrick, Cella, Harper & Scinto

(57) ABSTRACT

An image combining method for combining an image obtained by image sensing real space with a computer-generated image and displaying the combined image. Mask area color information is determined based on a first real image including an object as the subject of mask area and a second real image not including the object, and the color information is registered. The mask area is extracted from the real image by using the registered mask area color information, and the real image and the computer-generated image are combined by using the mask area.

13 Claims, 14 Drawing Sheets

U.S. PATENT DOCUMENTS

2003/0185461 A1    10/2003   Ohshima .................... 382/284
2004/0032906 A1*    2/2004   Lillig .................... 375/240.08

FOREIGN PATENT DOCUMENTS

| | | |
|---|---|---|
| JP | 10-149449 | 6/1998 |
| JP | 11-88913 | 3/1999 |
| JP | 11-120359 | 4/1999 |
| JP | 2002-5743 | 1/2002 |
| JP | 2002-157606 | 5/2002 |
| JP | 2003-244581 | 8/2003 |
| JP | 2003-296759 | 10/2003 |

OTHER PUBLICATIONS

Japanese Official Communication dated Feb. 23, 2009, regarding Japanese Counterpart Application No. 2003-341624.

* cited by examiner

204

208

CORRECTION OF SUBJECT AREA DETECTION INFORMATION, AND IMAGE COMBINING APPARATUS AND METHOD USING THE CORRECTION

FIELD OF THE INVENTION

The present invention relates to an image combining apparatus, and more particularly, to an image combining apparatus and method for combining a computer graphic image with a real scenery image as a background and displaying the combined image. Further, the present invention relates to generation and correction of subject area detection information used for detecting a predetermined subject area from a real image, and more particularly, to correction of subject area detection information useful upon combining of a real image with a computer graphic image in consideration of a predetermined subject area in the real image.

BACKGROUND OF THE INVENTION

A mixed reality technique for superposing a computer graphic image on a real scenery image as a background such that a user feels like a virtual object exists on the spot is known (for example, see Japanese Patent Application Laid-Open No. 11-088913 (counterpart US patent application is U.S. Pat. No. 6,522,312 (Oshima)). To realize realistic-sensations experience using this technique, it is important to enable the user's actual interaction such as touching or operating (feeling of touching or operating) the CG-drawn virtual object (hereinbelow, also simply referred to as a "virtual object") in addition to superpose-display of CG image on the background real landscape image. To realize such interaction, it is necessary to display the user's hand(s) or the like (hereinbelow, referred to as a "subject(s)") operating the virtual object in front of (foreground of) the virtual object. In a case where the user's hand(s) or the like which should be in the foreground of the CG virtual object is hidden with the virtual object, the sense of distance from the virtual object and the sense of reality break down, and the realism is impaired.

To solve this problem, the applicant has proposed in Japanese Patent Application Laid-Open No. 2003-296759a technique of preventing a foremost subject image from being hidden with a CG image. According to the technique, a background and a subject are obtained as real images, and color information on the subject to be displayed in front of the CG image (subject detection information) is manually registered in the system. Then CG drawing is prohibited in a pixel area having the registered color information. By using this technique, the subject as a foreground image can be displayed in front of the virtual object, without being hidden with the CG image, and the user can experience high-realism mixed reality.

However, in the above technique, as the registration of subject color information is manually performed, the registration cannot be easily performed by anyone but a worker with knowledge and experience. Further, as the subject area is determined only in accordance with color information, noise occurs due to erroneous recognition of subject area. That is, there is room for improvement.

From this technical background, there is a need for a technique of enabling registration of subject detection information with a comparatively simple operation which can be performed by a person without knowledge and experience such as a user or a system operator in place of manual registration of subject detection information by a worker with experience and knowledge.

Further, even if the subject color information can be registered by simple calibration, when a subject area is determined only in accordance with color information, an area in the background including a color similar to the subject's color is erroneously recognized as the subject. In this case, CG drawing in the area is prohibited and the background image appears. Further, in a case where the subject color information has changed due to change of illumination condition or the like, even an area inside the subject is erroneously recognized as a non-subject area, and a CG image is drawing on the subject. That is, in an area erroneously recognized as a subject area, CG drawing is prohibited and a background image which must be hidden is exposed. In an area erroneously recognized as a background (non-subject) area, a CG is drawn on the subject area in which CG drawing must be prohibited. Thus, reduction of noise due to erroneous recognition such as a background image in a CG image and a CG image in a subject is desired. Further, for accurate subject area detection, appropriate correction of subject detection information is also desired.

SUMMARY OF THE INVENTION

The present invention has been made in consideration of the above problems and technical requirements of the conventional art. One of the principal objects of the present invention is to enable registration of subject detection information for detection of subject area in a real image with a simple operation.

Further, another one of the principal objects of the present invention is to enable intuitive and simple correction of registered subject detection information.

Further, another object of the present invention is to eliminate noise which appears in a displayed image.

According to one aspect of the present invention, there is provided an image combining method for combining a real image obtained by image sensing real space with a computer-generated image and displaying a combined image, comprising: an extraction step of extracting a mask area from the real image by using mask area color information; a combining step of combining the real image with the computer-generated image by using the mask area; and a registration step of determining the mask area color information, based on a first real image including an object to be the subject of the mask area and a second real image not including the object, and registering the mask area color information.

Also, according to another aspect of the present invention, there is provided a correction method for correcting subject detection information for detection of a predetermined subject area included in a real image, comprising: a real image acquisition step of obtaining a real image; a subject area image generation step of extracting the predetermined subject area from the real image by using currently registered subject detection information, and generating a subject area image where the predetermined subject area and the area other then subject area in the real image are represented visually differently; a correction image generation step of generating a correction image obtained by superposing the subject area image as translucent image over the real image; a presentation step of presenting the correction image via a user interface; and an update step of generating subject detection information to be added/deleted to/from color information of an area in the real image corresponding to an area of the correction image designated via the user interface, and updating the currently-registered subject detection information.

In accordance with the present invention as described above, subject detection information for detection of subject area can be automatically registered. Further, the registered subject detection information can be corrected with a simple operation. Further, in the above construction, noise which appears in a displayed image can be eliminated.

Other features and advantages of the present invention will be apparent from the following description-taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
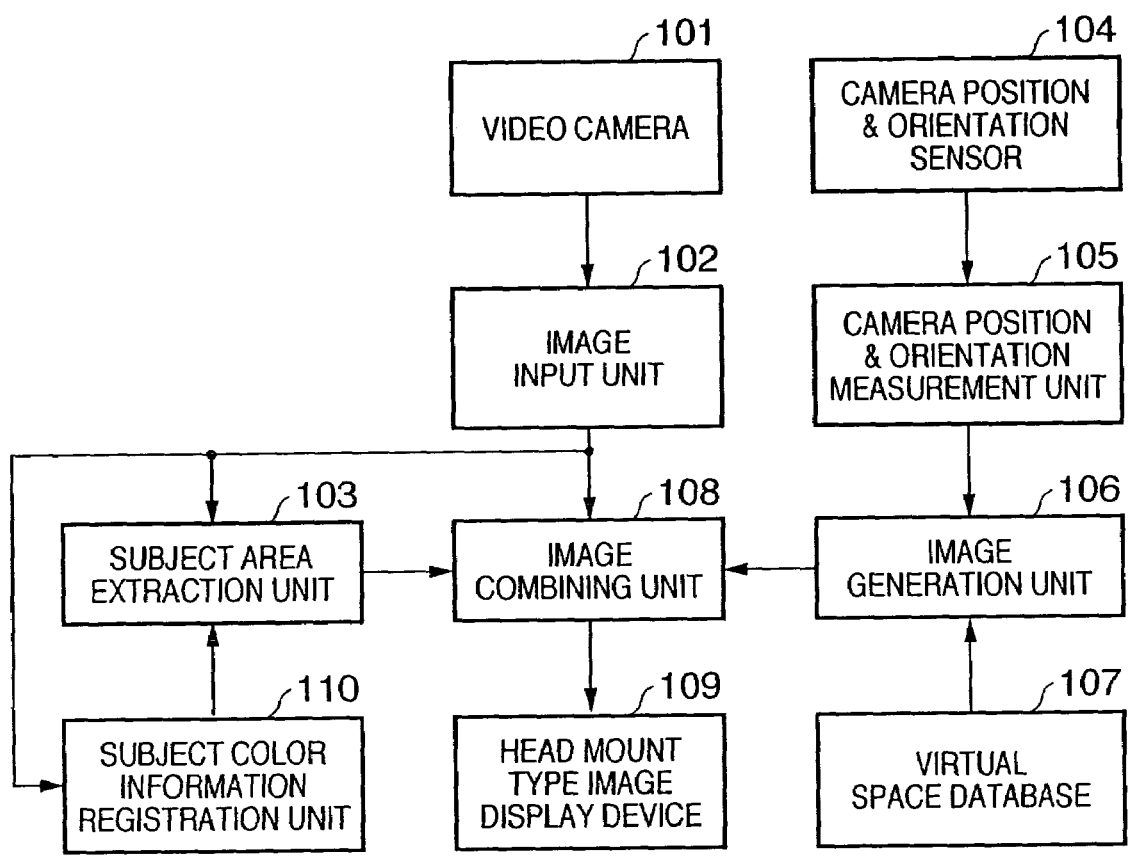
FIG. 1 is a functional block diagram showing the construction of a video combining apparatus according to a first embodiment of the present invention.
Figure 2:
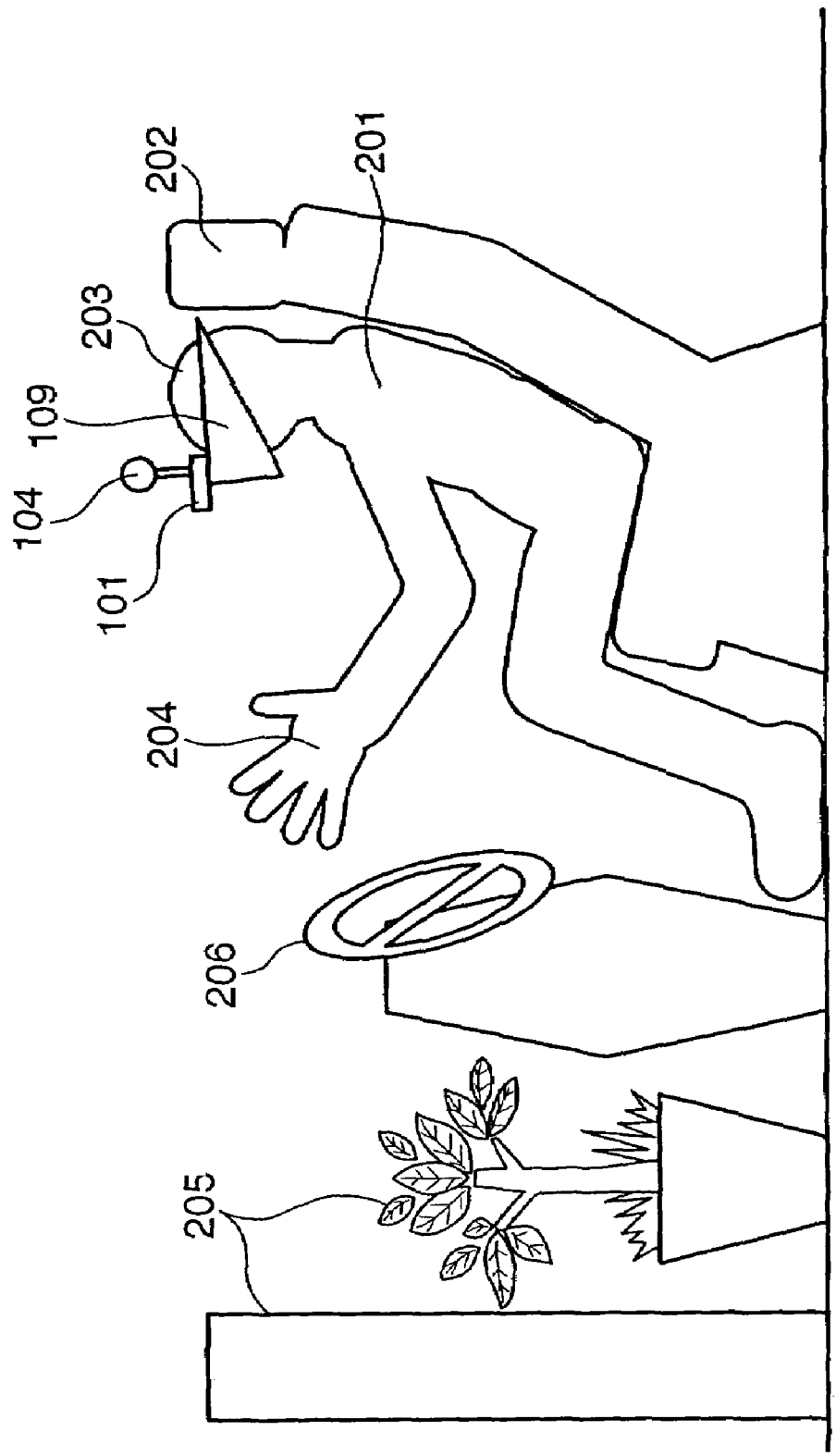
FIG. 2 is a schematic diagram showing the first embodiment.

FIG. 1 is a functional block diagram showing the construction of a video combining apparatus according to a first embodiment of the present invention. In FIG. 1, a small video camera 101 performs image sensing on real space. Arrows in FIG. 1 mean electrical signal flows. As shown in FIG. 2, the video camera 101 is fixed to a head mount type image display device (Head Mount Display (HMD)) 109 attached to a user-(a person who experiences mixed reality) 201 in a position close to the user's eyes, in a direction corresponding with the user's view direction. An image input unit 102 inputs an image (video image) obtained by the video camera 101. The image input unit 102 processes a signal of the image obtained by the video camera 101, and supplies the signal as digital image data to a subject area extraction unit 103 and an image combining unit 108 to be described later. The signal is combined with a CG image generated by an image generation unit 106, and displayed on the user's HMD 109.

A subject area extraction unit 103 extracts color information registered in the subject color information registration unit 110 from an input video image, and sends the result of extraction as a subject area to an image combining unit 108. That is, the subject area extraction unit 103 compares color information of each pixel of the digital image data supplied from the image input unit 102 with color information of the subject registered in the subject color information registration unit 110, and if the both data correspond with each other, determines that the pixel belongs to the subject area. Note that as well as determination of complete correspondence, the determination may be performed based on a predetermined allowable error range. As the result of determination, if the pixel is included in the subject area, e.g., a value "1", otherwise, a value "0", is allocated to the pixel. Thus the result of determination is supplied in the form of image data to the image combining unit 108.

On the other hand, a camera position & orientation measurement unit 105 detects the position and orientation of the video camera 101 based on a signal from a camera position & orientation sensor 104, and sends the result of detection to the image generation unit 106. The camera position & orientation sensor 104, comprising e.g. a magnetic sensor, is attached to the HMD 109 as shown in FIG. 2. The camera position & orientation measurement unit 105 inputs the output signal from the position & orientation sensor 104, and estimates the three-dimensional position and orientation of the video camera 101. Note that the camera position & orientation sensor 104 may arbitrarily comprise other means such as an optical sensor, a ultrasonic sensor or a mechanical sensor than the magnetic sensor in accordance with purpose.

The image generation unit 106 generates a CG image in correspondence with an image obtained by the video camera 101 by using the information on the three-dimensional position and orientation of the camera supplied from the camera position & orientation measurement unit 105. Upon generation of CG image, CG model geometrical information included in a virtual space database 107, attribute information such as color, texture and the like, and illumination information are used. As the generation of three-dimensional CG image is well-known technique, the explanation thereof will be omitted. The generated CG image is sent to the image combining unit 108.

The image combining unit 108 superposes the CG image generated by the image generation unit 106 on the video image inputted from the image input unit 102. At this time, in the subject area (value "1" area) sent from the subject area extraction unit 103, CG image drawing is prohibited, but the video image from the video camera 101 is displayed. The image information generated by the image combining unit 108 is sent to the HMD 109 and displayed there.

Note that in the above construction shown in FIG. 1, the video camera 101 and the camera position & orientation sensor 104 are attached to the HMD 109, and the other elements are realized by execution of necessary software on a general computer having e.g. a video capture function. Further, although not shown in FIG. 1, the video combining apparatus of the present embodiment includes a display device (monitor) and input devices such as a mouse and a keyboard, for the operator to perform apparatus setting or the like.

Figure 3A:
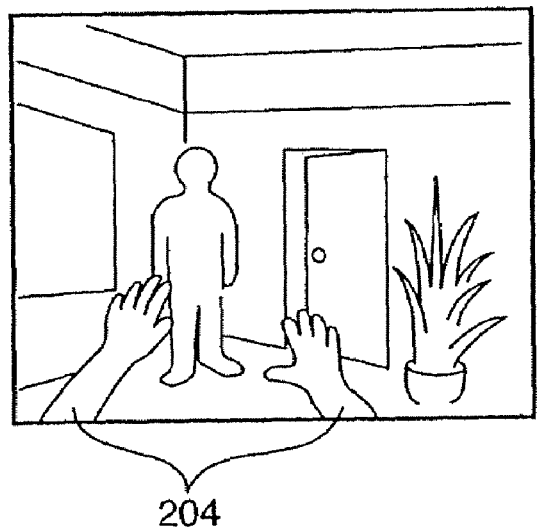
FIGS. 3A to 3C are explanatory views of necessary material images of a combined image.
Figure 3B:
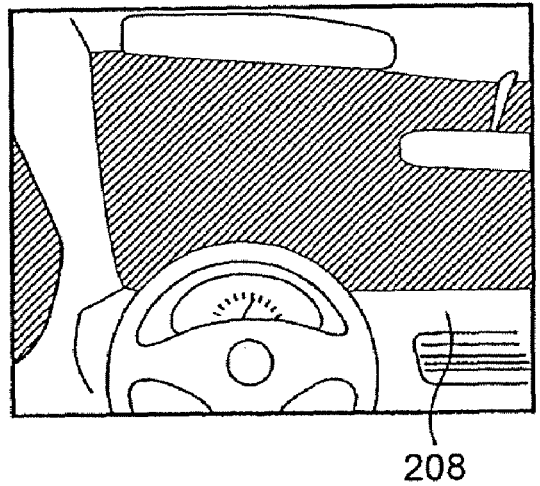
Figure 3C:
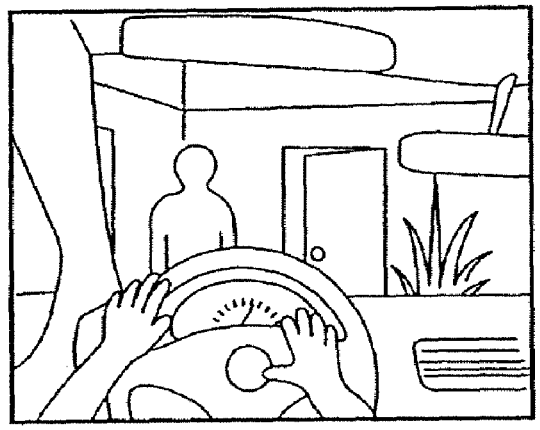

The above construction and the operation thereof will be described in more specifically with reference to FIGS. 2 and 3A-C. FIG. 2 is a schematic diagram showing an application of the video combining apparatus according to the present embodiment (the system in FIG. 1 is applied to a mixed reality application). FIGS. 3A to 3C are explanatory views of image combining in the video combining apparatus according to the present embodiment.

As shown in FIG. 2, the user 201, with the HMD 109 as a display device to display a combined image of real and CG images attached to a head 203, is in a seat 202. The user may have other arbitrary posture than the seated posture. Further, the video camera 101 and the camera position & orientation sensor 104 are mounted in the HMD 109. Note that in the present embodiment, a real subject to be a foreground image corresponds to the hands 204, of a user 201, and real objects to be background images, correspond to other real materials (a wall, a potted plant, a steering wheel 206 and the like) 205.

In an image displayed on the HMD 109, a CG image as shown in FIG. 3B (a virtual car interior image 208) is superposed on a real scenery image as shown in FIG. 3A as a background. At this time, the subjects (the user's hands 204) are displayed, as foreground images, on the CG image. Thus a combined image as shown in FIG. 3C is generated. In this manner, it is important not to draw a CG image in a subject area as a foreground image such that the user experiences mixed reality with high sense of realism.

Figure 4B:
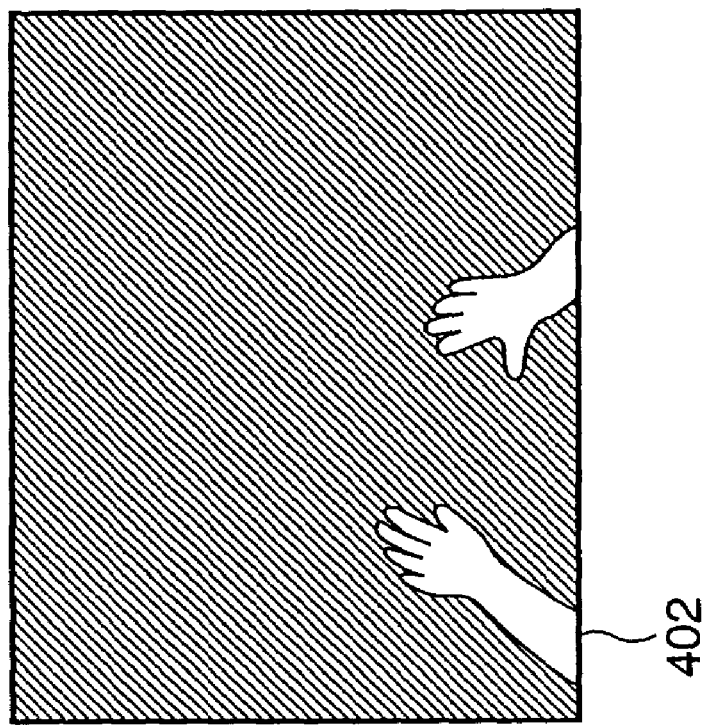
FIGS. 4A and 4B are explanatory views of subject area extraction.
Figure 4A:
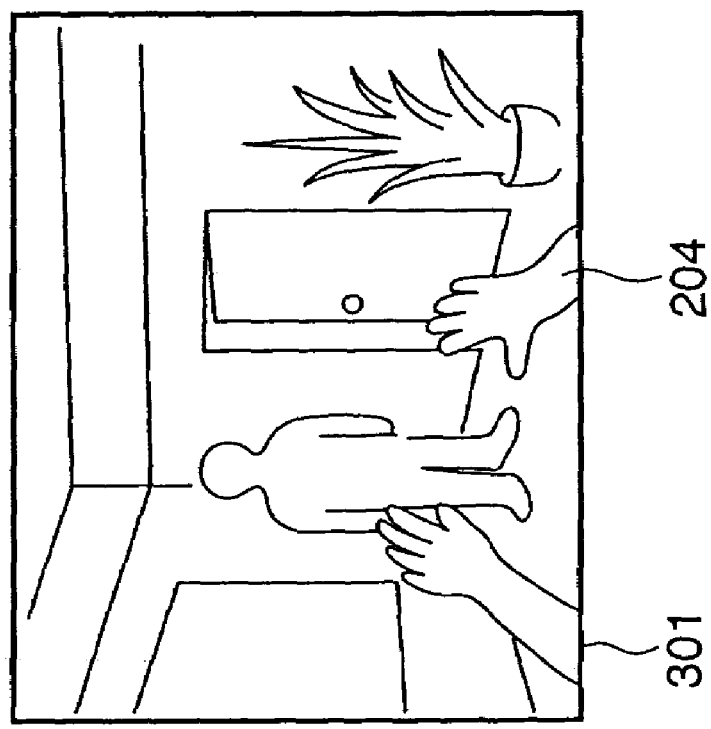

FIGS. 4A and 4B are explanatory views of subject area extraction by the subject area extraction unit 103. FIG. 4A shows an example of real image obtained by the video camera 101 corresponding to FIG. 3A. In a real image 301, as the user 201's hands 204 are included in the field of vision of the video camera 101, the hands 204 as the subjects to be foreground images exist, with a real scenery to be a background image, in the image. Color information as subject detection information to detect the hands 204 as the subjects is previously registered in the subject color information registration unit 110 (the details of registration will be described later). The subject area extraction unit 103 compares color information of each pixel of the real image 301 with color information of the subjects. If the color information of the pixel is included in the subject area, "1" (white), otherwise, "0" (black) is allocated to the pixel. Thus a binary image is generated. A subject area image 402 shown in FIG. 4B is generated by the analysis of the real image 301 in this manner, where white areas correspond to the hands, i.e., foreground images of the CG image. As a CG image is not combined in the subject areas, a combined image of the real image and the CG image, where the user's hands as foreground images are displayed, can be obtained.

Note that the predetermined color space used by the subject area extraction unit 103 and the subject color information registration unit 110 is multidimensional color space. The color information is described as coordinates in this multidimensional color space. As well-known multidimensional color spaces (calorimetric systems), various systems such as RGB, YIQ, YCbCr, YUV, HSV, Lu*v* and La*b* can be used (see Japanese Standards Association, "JIS (Japanese Industrial Standards) Color Handbook").

Appropriate color space may be employed in correspondence with the color characteristic of subject, however, to cancel out change of color characteristic of subject due to difference in illumination condition, it is desirable to use a calorimetric system where luminance coordinate information and color coordinate information are separated and to use only color coordinate information (information other than luminance coordinate information) as subject color information. As such colorimetric systems, the YIQ and YCbCr color spaces are representative systems. Hereinbelow, the YCbCr colorimetric system is used in the present embodiment.

Figure 6:
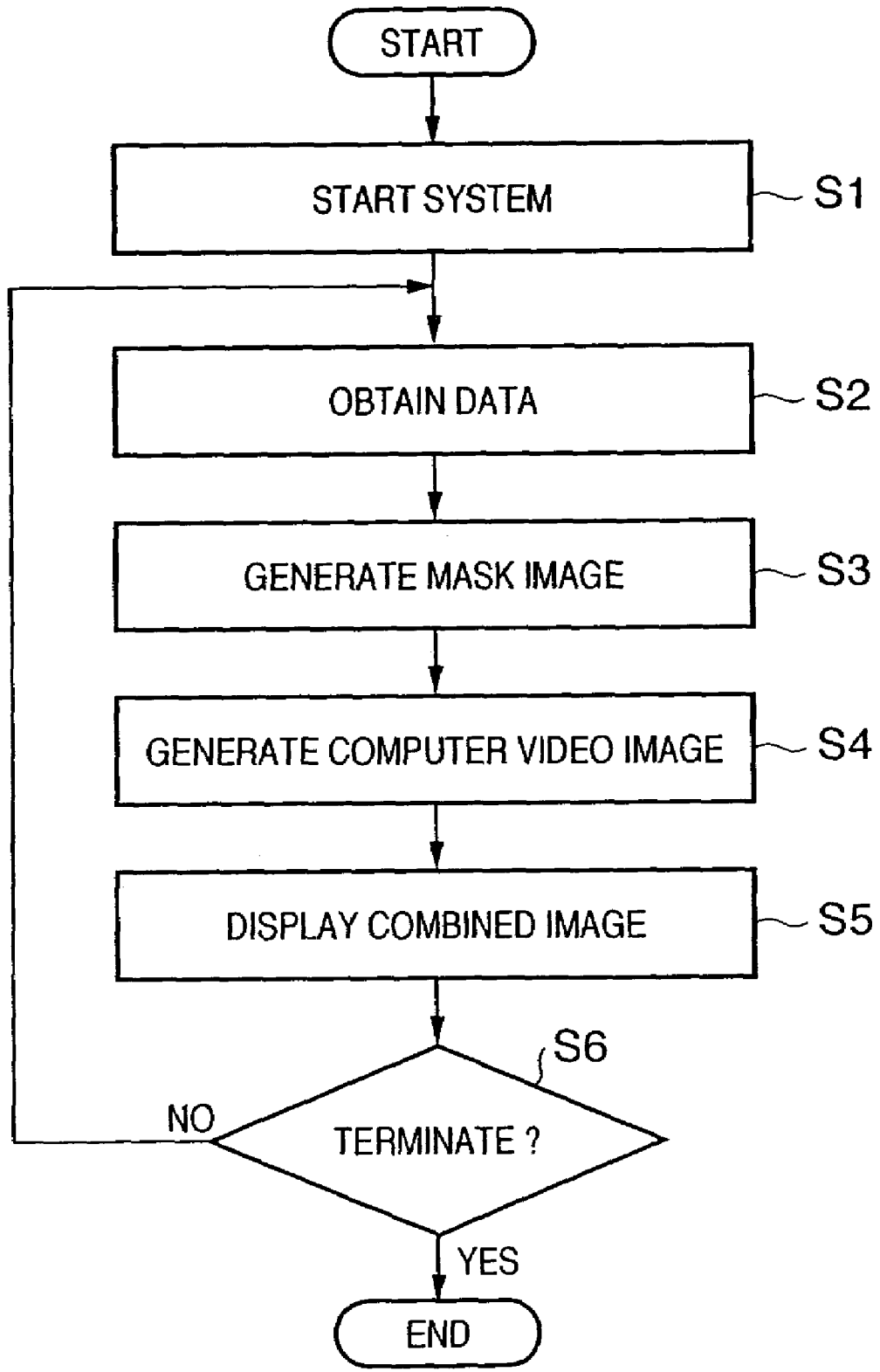
FIG. 6 is a flowchart showing the flow of processing according to the first embodiment.

FIG. 6 is a flowchart showing the flow of processing in the entire system according to the first embodiment. Note that prior to the start of the processing in FIG. 6, subject color information to extract a subject area as a foreground image of a CG image is registered in the subject color information registration unit 110. Note that the details of registration of subject color information in the subject color information registration unit 110 will be described with reference to FIGS. 7 to 9A-C. Further, in the present embodiment, to operate the system in real time, the registration of subject color information is performed prior to the start of the system. However, if the system has sufficient performance, the subject color information may be updated in real time.

After the registration of subject color information, the system is started at step S1. Steps S2 and S3 correspond to processing by the subject area extraction unit 103. At step S2, RGB signals of each pixel in an image obtained by the video camera 101 is converted to predetermined color space (color space representing the subject color registered in the subject color information registration unit 110, YCbCr in the present embodiment). At step S3, it is determined whether or not the converted pixel corresponds with the subject color registered in the subject color information registration unit 110. If the color of the pixel corresponds with the registered subject color, the value "1", otherwise, the value "0", is allocated to the pixel. In this manner, a binary mask image (subject area image) as shown in FIG. 4B is generated.

At step S4, based on the position and orientation of the camera inputted from the camera position & orientation measurement unit 105 and drawing information in the virtual space database 107, the image generation unit 106 generates a CG image viewed from the position and orientation. Then the image combining unit 108 performs mask processing on the CG image with the mask image (subject area image) obtained at step S3. That is, at step S4, a computer video image masked with the mask image is generated. At step S5, the mask-processed CG image and a real image obtained from the video camera 101 are combined, and the combined image is displayed on the HMD 109.

Thereafter, it is checked at step S6 whether or not the system is to be terminated. If the system is not to be terminated, the process returns to step S2, to repeat the above processing. If the system is to be terminated, the process ends.

Subject Color Information Registration Processing

Next, the method of subject color information registration in the subject color information registration unit 110 described in FIG. 1 will be described with reference to FIG. 5 and FIGS. 7 to 9A-C.

Figure 5:
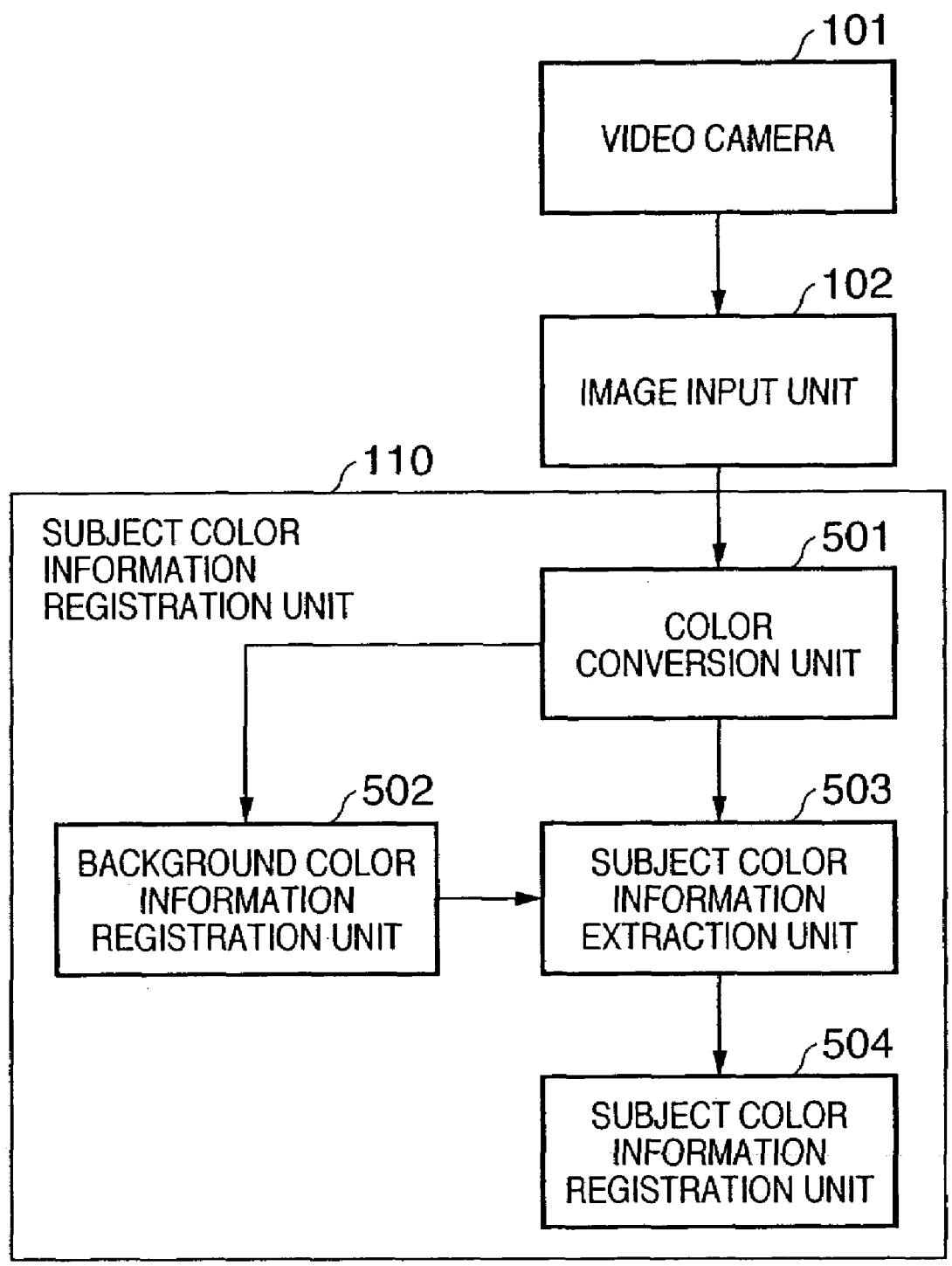
FIG. 5 is a block diagram showing the details of a subject color information registration unit.

FIG. 5 is a block diagram showing the details of the subject color information registration unit 110. First, to extract subject color information, only an image of scenery is obtained by the video camera 101. The image is digitized by the image input unit 102, and converted to the predetermined color space (YCbCr in the present embodiment). Thereafter, the data is sent to a background color information registration unit 502 and registered there. That is, the image information only with the background is stored as background color information into the background color information registration unit 502. Next, image sensing is performed with the video camera 101 so as to obtain an image including the background obtained upon registration of background color information and the subjects. The image obtained by the image sensing is converted to the predetermined color space via the image input unit 102 and the color conversion unit 501, and inputted into the subject color information extraction unit 503. The subject color information extraction unit 503 compares the background color information registered in the background color information registration unit 502 with the image information including the subject, and extracts color information not included in the background color information. The color information extracted by the subject color information extraction unit 503 is registered as subject color information in a subject color information registration unit 504.

In the present embodiment, a background image not including subject(s) (corresponding to an image where the user's hands 204 are excluded from FIG. 4A), and a background image including subject(s) (corresponding to FIG. 4A) are obtained, and color information only included in the background image including the subject(s) is detected as subject color information.

Figure 7:
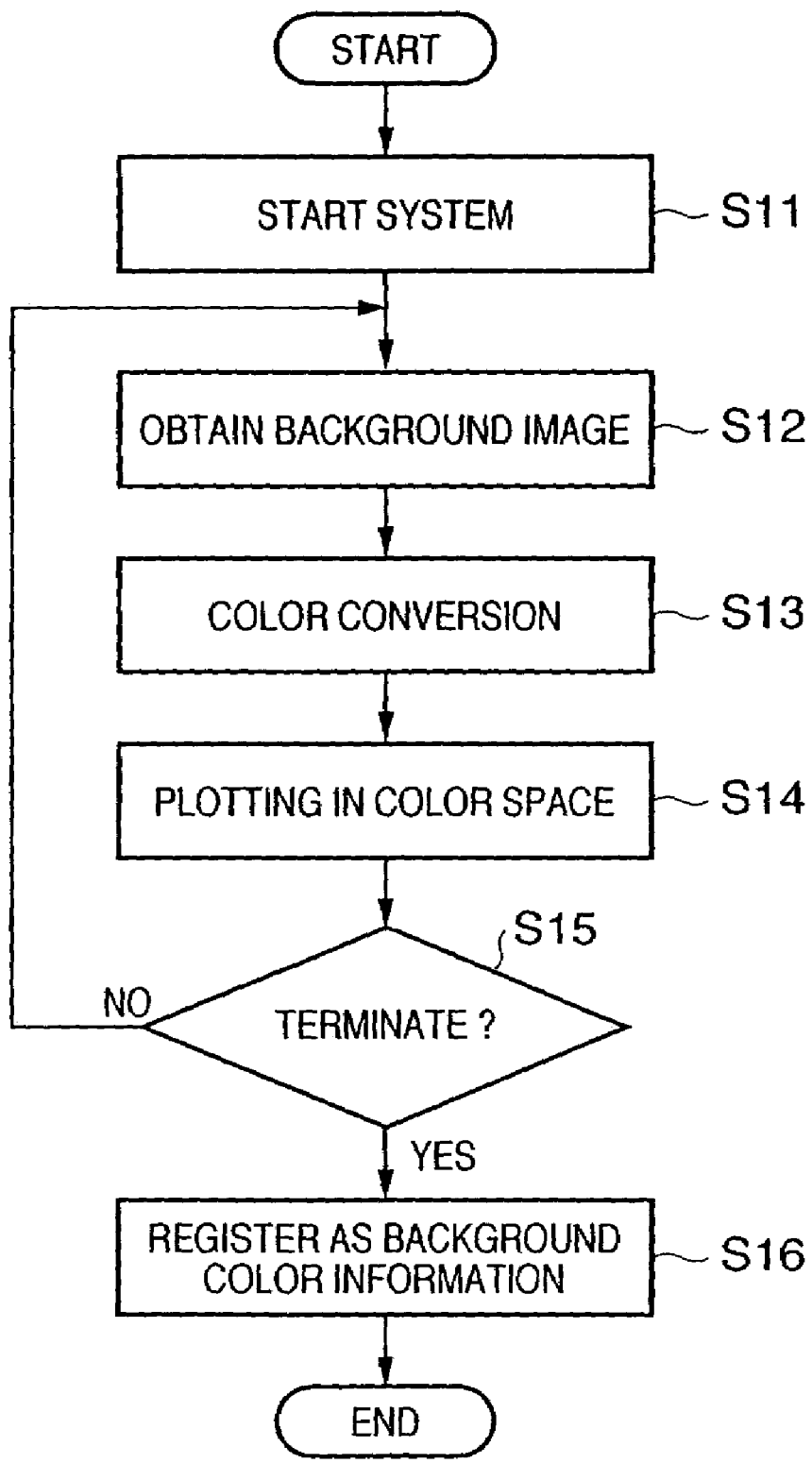
FIG. 7 is a flowchart showing the flow of background color information registration processing.
Figure 8:
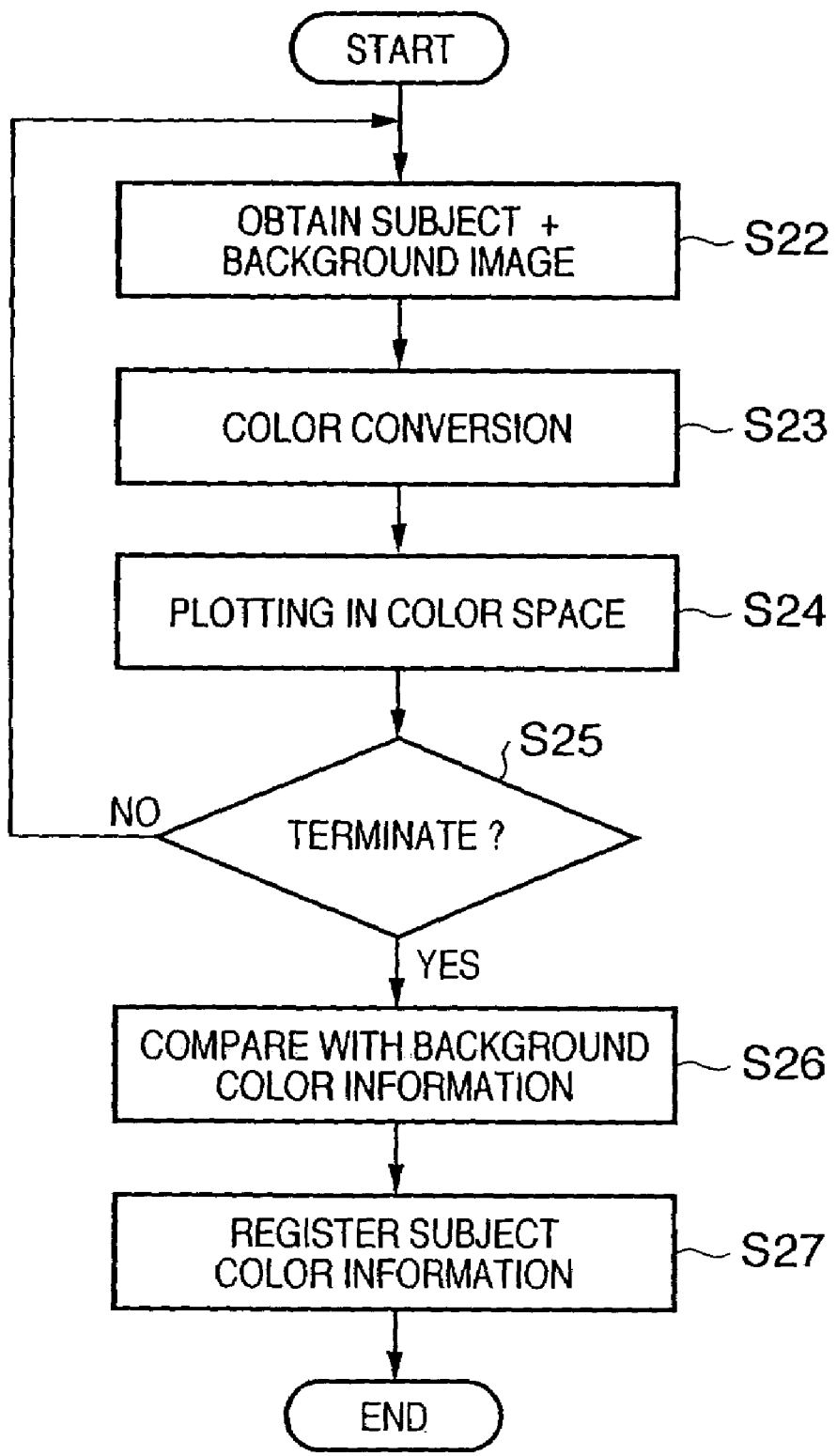
FIG. 8 is a flowchart showing the flow of subject color information registration processing.
Figure 9:
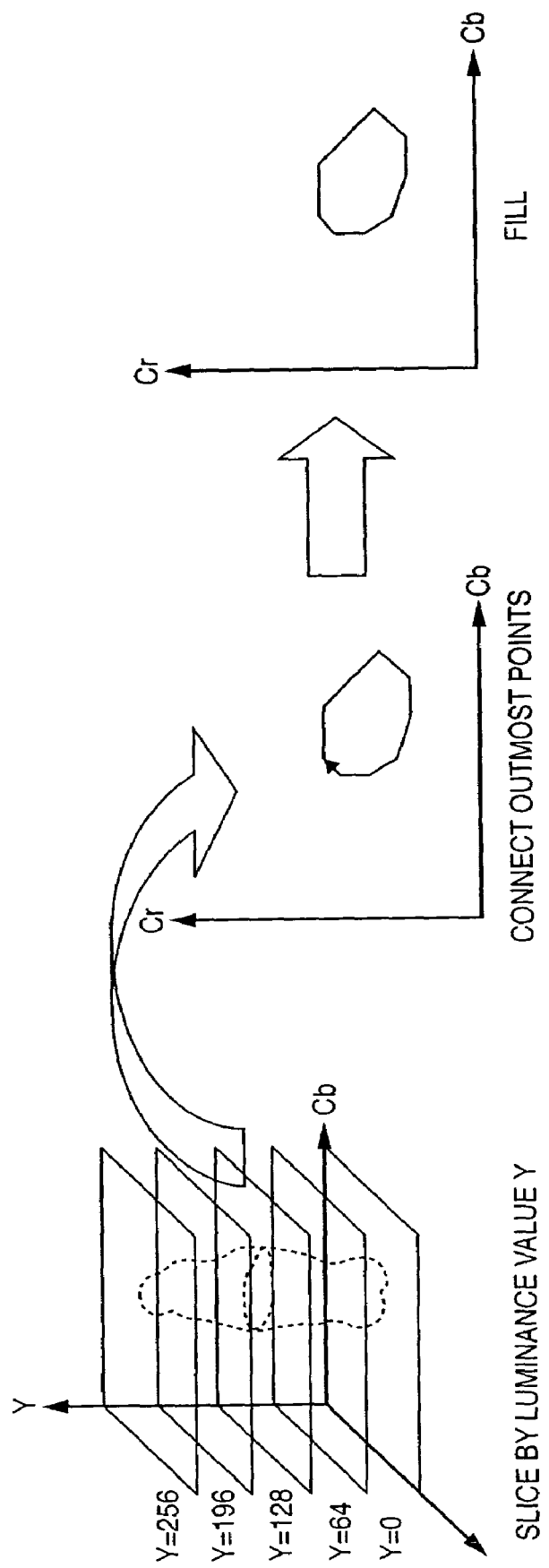
FIGS. 9A to 9C are explanatory views of convex closure processing.

Hereinbelow, the subject color information registration processing will be further described with reference to FIGS. 7 and 8.

First, to register subject color information, it is necessary to register background color information in the background color information registration unit 502. FIG. 7 is a flowchart showing the background color information registration. In FIG. 7, at step S11, the system is started, then at step S12, a background image (an image not including the subjects) is obtained from the video camera 101 via the image input unit 102. Note that upon acquisition of background image at step S12, it is important not to include subject color information in the background image as much as possible.

Next, at step S13, the image obtained at step S12 is converted to the YCbCr colorimetric system by the color conversion unit 501. The color conversion unit 501 supplies the background image data to the background color information registration unit 502. At step S14, the background color information registration unit 502 extracts the color of pixel included in the image data converted by the color conversion unit 501, and plots the color in the YCbCr space. To obtain a sufficient number of samples (step S15), steps S12 to S14 are repeated plural times, thus the background color is registered in the YCbCr space. Note that the number of repetitions is arbitrary. When the repetition of predetermined times has been completed, the process proceeds from step S15 to step S16, at which the result of plotting at step S14 is registered as background color information.

When the background color information has been registered in the predetermined color space, the subject color information registration is performed. FIG. 8 is a flowchart showing the subject color information registration.

At step S21, the system is started, and at step S22, a "background+subject" background image is obtained from the video camera 101. At step S23, the image obtained at step S22 is converted to the YCbCr color space by the color conversion unit 501, and the converted data is supplied to the subject area extraction unit 503. At step S24, plotting in the YCbCr space is performed. As in the case of FIG. 7, steps S22 to S24 are repeated several times (step S25), and the color information of "background+subject" image are registered in the YCbCr space. The number of repetition times is arbitrary, but it is preferable that the above processing is repeated while the angle of subject is changed so as to change illumination of the subject.

When the repetition has been made predetermined number of times, the process proceeds from step S25 to step S26, at which the color information extracted at step S24 is temporarily stored in the subject color information registration unit 504. Then, the subject color information extraction unit 503 compares the background color information registered in the background color information registration unit 502 with the color information registered in the subject color information registration unit 504 (step S26). In the color information stored in the subject color information registration nit 504, color information not registered as the background color information is registered as color information of the subject, i.e., subject color information (step S27).

Note that the 2 types of background images used here (the background image not including the subjects and the background image including the subjects) can be obtained by the user wearing the HMD 109 who watches the background and the subjects while monitoring an operation screen. As the background images are used in color extraction, the shift between camera positions upon acquisition of 2 types of images by image sensing can be ignored to a certain degree. However, if an image including much subject color information is registered as a background, such portion is deleted from the subject color information. In such case, the degradation of accuracy of subject color information may cause noise areas to be described later. Accordingly, it is preferable to perform image sensing here by using a cloth or the like which does not cause mirror surface reflection, as a background in one color such as black or blue.

Further, the subject color information may be obtained by other methods. For example, in the present embodiment, in the 2 types of background images, the color included in only the background image including the subject is obtained as subject color information, however, it may be arranged such that a subject area is extracted from the 2 types of background images, and the color of pixel included in the extracted subject area is obtained as the subject color information. Various methods can be used for extracting a subject area from 2 types of background images. For example, by using a motion detection technique used in moving picture compression, a corresponding area between the 2 types of background images is obtained and a difference therebetween is obtained. Further, it may be arranged such that the camera is fixed and a pixel level background difference is obtained, then only a subject area is cut out, and color information within the area is registered.

<Convex Closure Processing>

As the subject color information obtained at step S26 partially lacks subject color information, it must be interpolated. Accordingly, in the registration of subject color information at step S27, convex closure processing for interpolating defective subject color information is performed.

FIGS. 9A to 9C are explanatory views of the convex closure processing. In the convex closure processing, first, as shown in FIG. 9A, the YCbCr space is sliced by luminance value Y. On a CbCr plane obtained by the slicing, the subject color information upon slice by the luminance value Y is plotted as a point group. Then, as shown in FIG. 9B, the outside of the point group on the CbCr plane is connected with a line, and a closed area including all the points is determined. As shown in FIG. 9C, interpolation is performed on the subject color information on the assumption that all the information inside the closed area determined in FIG. 9B is the subject color information. Note that to eliminate the influence of change in color tint due to difference of illumination condition or the like, only color coordinate information (information other than luminance coordinate information) is used as the subject color information by projecting the results of mapping with all the Y values on one CbCr plane and using the obtained point group. However, in a case where the background includes many black parts, as a Y value close to "0"

(black) is unnecessary, cutback (threshold value processing) calculation may be performed by Y value, so a to eliminate such unnecessary value.

<Subject Area Extraction Processing>

Figure 10:
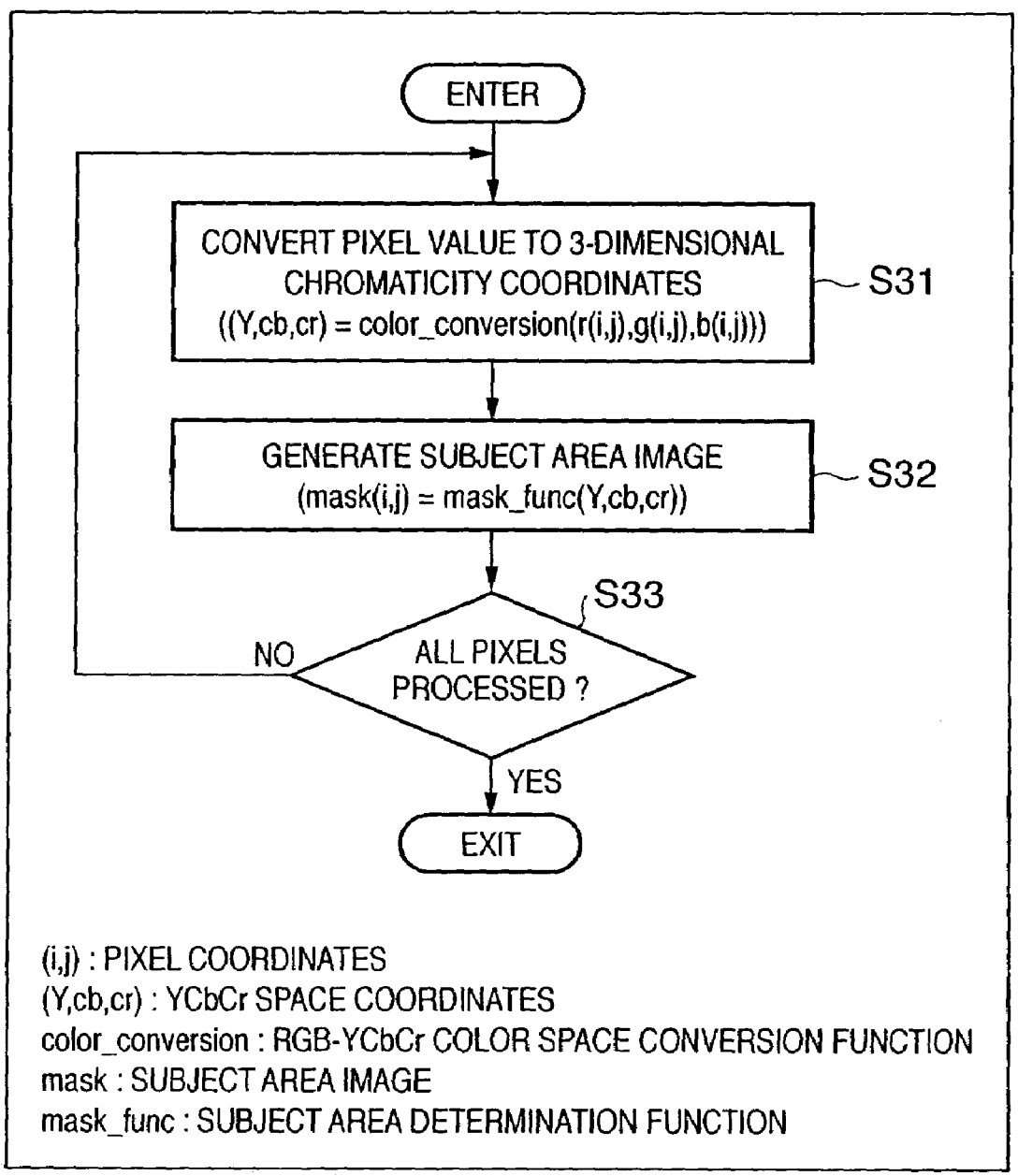
FIG. 10 is a flowchart showing subject area extraction processing.

Next, the processing in the subject area extraction unit 103 will be described with reference to the flowchart of FIG. 10. The processing shown in FIG. 10 is performed on each pixel of the image data supplied from the image input unit 102, thus a subject area is extracted. First, at step S31, RGB values (r(i,j), g(i,j), b(i,j)) of image coordinates (i,j) are substituted into a color space conversion function (color_conversion) for conversion to a YCbCr space coordinates, then calculation is performed, thereby YCbCr space coordinates (Y,cb,cr) of the RGB values in the image coordinates (i,j) are obtained. Then, at step S32, the subject color information registered in the subject color information registration unit 110 is referred to, with the YCbCr space coordinate values (Y,cb,cr) as input, then it is determined whether or not the point in the color space belongs to the area of the subject color information.

A subject area determination function mask_func returns "1" if the input coordinates (Y,cb,cr) belong to a subject color information area, otherwise, returns "0". The processing at steps S31 and S32 is performed for all the image coordinates (step S33), thereby a binary subject area image having the values "1" indicating pixels belonging to the subject color information and the values "0" indicating pixels not belonging to the subject color information, is generated (FIG. 4B).

Note that the subject area image may be represented as probability distribution with continuous values from 0 to 1. For example, a portion on a CbCr plane where background color and subject color overlap with each other is represented as probability distribution. When the background color and the subject color have been extracted from a sample image, then the extracted colors are plotted in the CbCr plane. Assuming that the number of pixels of the background color plotted as coordinates x on the CbCr plane is BPx, and the number of pixels of the subject color, TPx, the probability distribution is obtained from TPx/(BPx+TPx).

Note that this expression is applicable to a case where the number of sample images including subject(s) is equal to the number of sample images not including the subject(s). If the number of sample images including subject(s) is not equal to that of sample images not including the subject(s), weighting with the number of sample images is required. Further, in CG drawing, alpha blending is performed by setting transmittance in accordance with values of probability distribution. As the transmittance is set, a portion in the subject area having a color close to the background color due to influence of shade and shadow can be displayed as a translucent area. Thus a border line between the subject and the background can be blurred, and the appearance can be improved.

<Noise Elimination in Mask Image Generation>

As the color information registered in the subject color information registration unit 110 includes color information other than the subject color which is close to the subject color information but which belongs to the background, the subject area image 402 includes area(s) other than the subject.

If a color portion included in the subject color information exists in the background other than the subject area, CG drawing is not performed in the area out of the subject area, and the portion may become noise. Otherwise, if a real image obtained by image sensing within the subject area includes a color not included in the subject color information, a CG drawing is performed in the subject area, which also becomes noise. The subject area extraction unit 103 of the present embodiment eliminates such noise and improves the quality of presented image.

Figure 11:
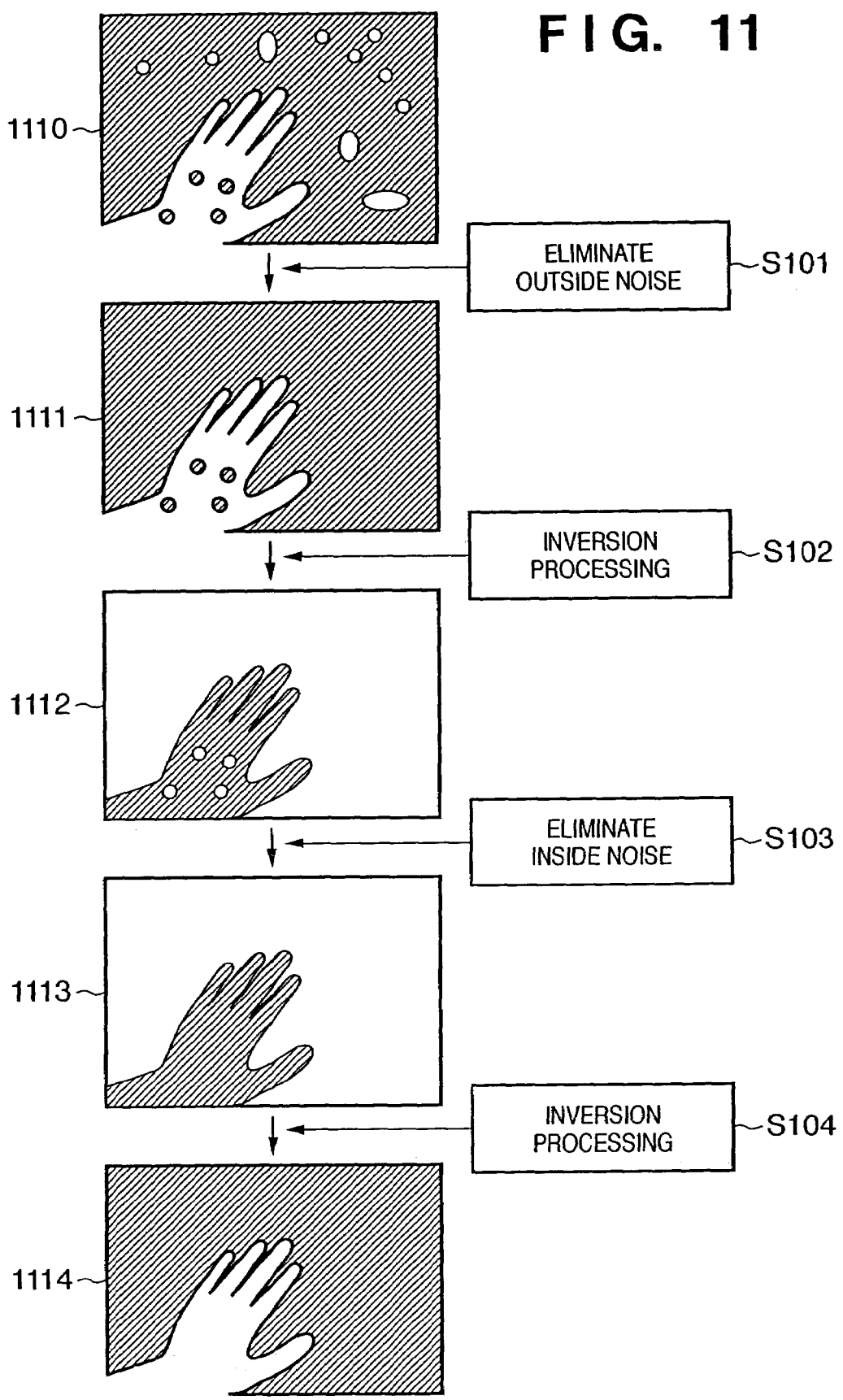
FIG. 11 is an explanatory view of noise elimination.

FIG. 11 is an explanatory view of noise elimination in a subject area image. A subject area image 1110 has noise outside and inside the subject area. The outside noise is an area of the background erroneously recognized as a subject area. The inside noise is an area in the subject area erroneously recognized as the background. At step S101, first, the outside noise is eliminated (the white portion outside the subject area is corrected to black), and an image 1111 is obtained. For example, the area of the entire subject area image is calculated by using a labeling technique frequently used upon calculation of connected area within an image. If the calculated area is smaller than a predetermined value, the area is regarded as noise and the area is eliminated. Note that in this example, the determination of noise is made based on the threshold value set for the area, however, in a case the number of the subjects is known, a predetermined number of areas from the largest area are determined as subject area, and the other subject areas may be eliminated.

Next, at step S102, in the subject area image 1111 obtained at step S101, the values "0" and "1" are inverted. By this processing, an image 1112 where the background and subject areas are inverted is obtained. At step S103, labeling is performed again on the subject area image obtained at step S102, and the subject area is calculated. As a result, the subject area is separated into an area having the largest area (background) and other areas (noise existing in the subject area). Since the areas other than the area having the largest area (background) are regarded as noise, these areas are eliminated, thereby noise elimination is performed inside the subject area. At step S104, a subject area image 1113 obtained at step S103 is inverted, to restore the previous background and subject areas. By the above processing, a subject area image 1114 where the noise inside and outside the subject area are eliminated can be obtained.

Note that in the above embodiment, a general labeling algorithm is employed for elimination of noise except the subject area, however, the noise elimination may be arbitrarily performed by other algorithms such as median filter and contraction and expansion processing, convex closure processing or the like on subject area candidates, in accordance with purpose. For example, 1) in a case where the borderline between the background and the subject is conspicuous, the convex closure processing is performed on the subject area, or (2) in a case where high-speed elimination of fine noise is desired, the contraction and expansion processing is performed on the subject area although the accuracy of noise elimination is lower than the labeling processing.

<Video Combining Processing>

In the image combining unit 108, a combined image (FIG. 3C) is generated by combining a real image (FIG. 3A) supplied from the image input unit 101 with a CG image (FIG. 3B) supplied from the image generation unit 106, by using a subject area image (FIG. 4B (noise-eliminated image as shown in FIG. 11)) supplied from the subject area extraction unit 110. The image combining unit 108 has a frame buffer as an image memory for image display of real image inputted from the image input unit 102 and an image memory stencil buffer for mask processing.

Figure 12:
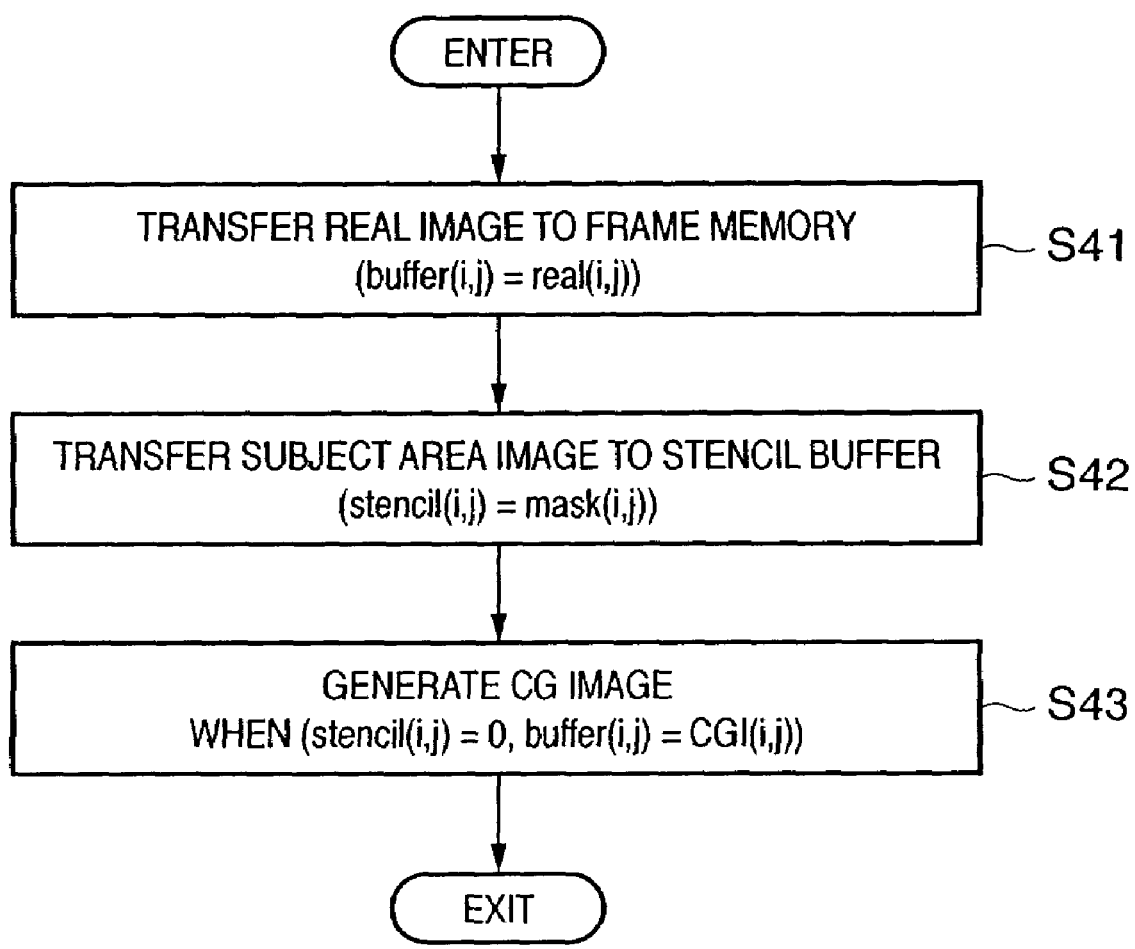
FIG. 12 is a flowchart showing the flow of image combining processing.

Next, image combining processing in the image combining unit 108 will be described with reference to FIG. 12. At step S41, a real image, real(i,j), inputted from the image input unit 102 is transferred to the frame buffer as an image memory for image display. At step S42, a binary (subject area pixel values are "1" and other area pixel values are "0") subject area image, stencil(i,j), generated by the subject area extraction unit 103, is transferred to the stencil buffer as an image memory for mask processing. At step S43, a CG image CGI (i,j) is generated by the image generation unit 106, and a stencil buffer value Stencil(i,j) is referred to regarding each coordinates (i,j) of pixel. If Stencil(i,j)=1 holds, i.e., a pixel in the real image, real(i,j), is included in the subject area, a corresponding frame buffer pixel, buffer(i,j), is not updated. Only if Stencil(i,j)=0 holds, i.e., the pixel in the real image, real(i,j), is not included in the subject area, the buffer (i,j) value is replaced with the pixel value CGI(i,j) of the CG image.

As a result, in the subject area, the pixel value of real image is always written into the frame buffer, while in the non-subject area, the pixel value of CG image is written into the frame buffer regarding a CG-superposed portion. Further, in a non-subject and CG-nonsuperposed area, the real image is written into the frame buffer. The image written in the frame buffer is displayed as a combined image on the HMD 109.

Note that in the present embodiment, the user's hands are used as the subjects to be drawn in the foreground, however, other objects may be employed.

As described above, according to the first embodiment, for extraction of subject area based on subject color information from a real image obtained by performing image sensing on a background as a background image of a CG image and subject(s) as foreground image(s) of the CG image, the subject color information can be easily registered. Further, as noise elimination is performed based on the result of extraction, a high quality image can be presented.

Second Embodiment

<Correction of Registered Subject Color Information>

Ideally, a proper combined image can be obtained by the processing described in the above embodiment, however, actually, the subject color information registered in the subject color information registration unit 110 may include color information of object different from the subject similar to the subject color information. In this case, the subject area image (mask image) 401 includes other mask area than the subject area. That is, if other color information than the subject color information is registered as subject color information, CG image drawing is prohibited in the non-subject area, and a background image appears in the area.

Otherwise, if color information which is subject color information but which is not registered as the subject color information exists, CG image drawing is performed in the subject area. In the present specification, such area not properly recognized as subject area or nonsubject area is referred to as a noise area.

In the first embodiment, such noise areas are eliminated by image processing as described in FIG. 11. In the second embodiment, the occurrence of noise area is prevented by updating the subject color information by using color information which causes such noise area.

To reduce or eliminate noise areas, correction of registered subject color information is required. The video combining apparatus according to the present embodiment easily corrects the subject color information as described below.

Figure 13:
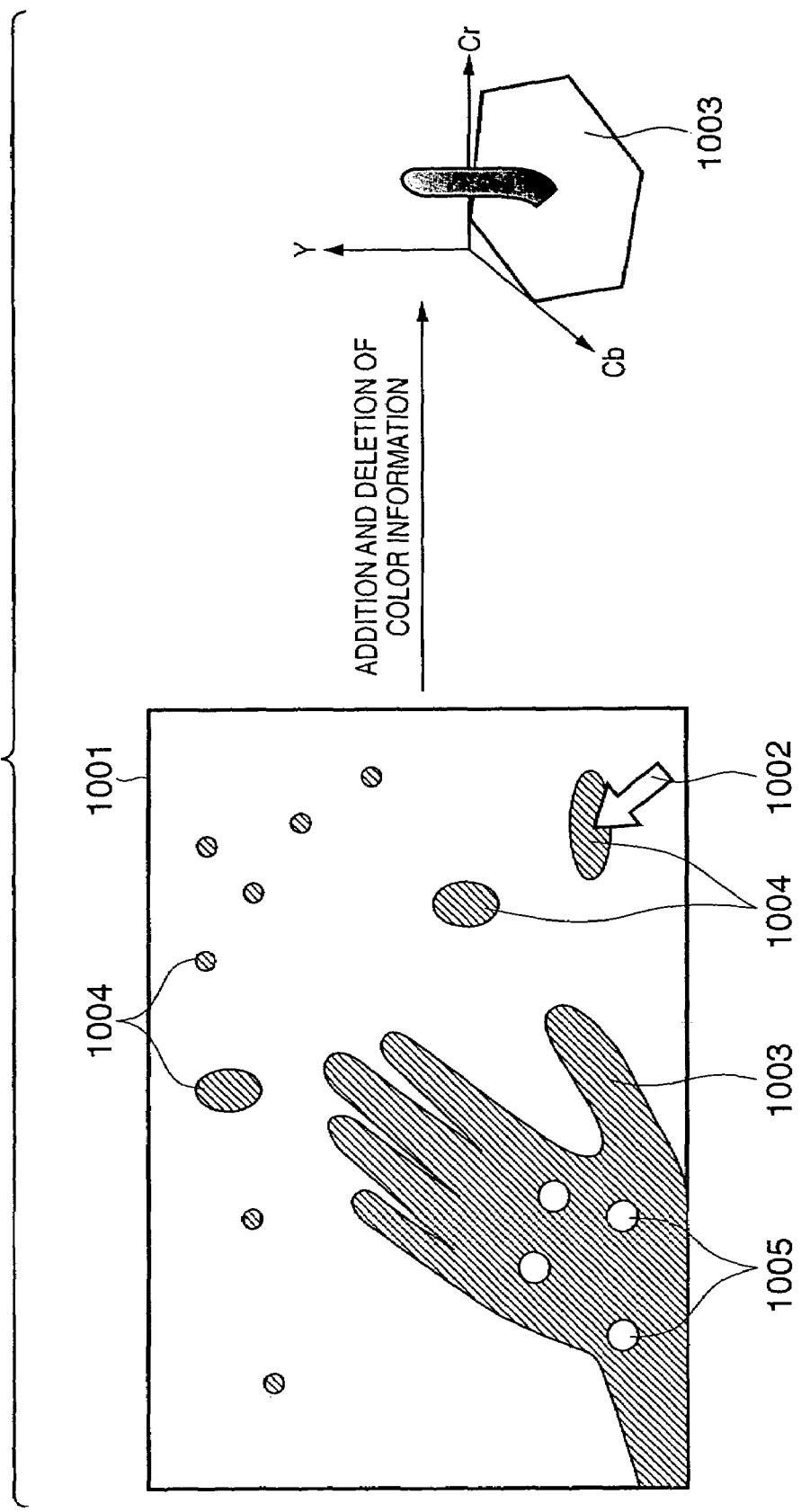
FIG. 13 is an explanatory view of subject color information correction processing according to a second embodiment of the present invention.

FIG. 13 shows an example of subject color information correction image and the outline of correction of registered subject color information realized in the video combining apparatus according to the present embodiment. In the subject color information correction image, a subject area image includes CG drawing areas (non-mask areas) and subject areas (mask areas) in 2 colors. These areas are translucent-displayed and superposed on a real image. Note that in FIG. 13, a background image which is seen in reality is not shown for the sake of simplicity of illustration.

A subject color information correction image 1001 has noise areas 1004 and 1005 outside and inside a subject area 1003. The outside noise area 1004 is a part of background erroneously recognized as a subject area. The inside noise area 1005 is a part of the subject area erroneously recognized as a background.

To reduce or eliminate the noise areas, the subject color information registered in the subject color information registration unit 110 must be corrected. In the video combining apparatus of the present embodiment, upon correction of subject color information, the subject area image, generated by the subject information extraction unit 103 in normal combined image generation processing, is generated as not a binary image but a 2-color image, and opacity information is added to the image, thus a translucent image is obtained. Then the image combining unit 108 does not combine a CG image with the above image, but generates a subject color information correction image by combining the subject area image with a real image in consideration of transparency. At this time, the real image may be obtained by the user 201 wearing the HMD 109, or may be obtained by the camera which is fixed while the user is in the same status.

The subject color information correction image is displayed, with a predetermined GUI (Graphical User Interface), on a monitor for the operator of the video combining apparatus. The operator manipulates a mouse while watching the subject color information correction image, to fill a noise area to be eliminated with a mouse cursor 1002 via the GUI. More particularly, the mouse cursor is dragged, and pixels over which the mouse cursor has moved are filled. It is preferable that the color of the pixels drag-marked in the subject color information correction image is changed to a color indicating image type after the change such that the operator can recognize the filled area. That is, in a case where the subject color information correction image has subject areas in red and other areas in blue, when a noise area which has been a subject area but has not been detected is filled, the color of filled pixels is changed from blue to red. Further, it may be arranged such that in a case where a large noise area such as the noise area 1004 is caused in the background, another button allocated to the mouse is clicked and the mouse is dragged, thereby the color is deleted from the subject color information.

In the subject color information correction image, RGB values (r(i,j), g(i,j), b(i,j)) of image coordinates (i,j) of a real image corresponding to a filled area are substituted into a color space conversion function (color_conversion) for conversion to YCbCr space coordinates, then calculation is performed, thereby YCbCr space coordinates (Y,cb,cr) of the RGB values in the image coordinates (i,j) are obtained. The obtained YCbCr space coordinates (Y,cb,cr) are additionally registered in the subject color information 1003, thereby noise occurred in the subject area is reduced. Further, in a case where a noise area existing outside the subject area is filled, the obtained YCbCr space coordinates (Y,cb,cr) are deleted from the subject color information. One of these operations may be designated by selecting addition of subject color information (elimination of noise area in the subject area) or deletion (elimination of noise area outside the subject area), from a menu in an operation screen image, prior to the filling. Otherwise, an addition/deletion selection function may be allocated to keys or buttons of the input device. For example, in the mouse, clicking of left button means "addition", while clicking of right button means "deletion".

Figure 14:
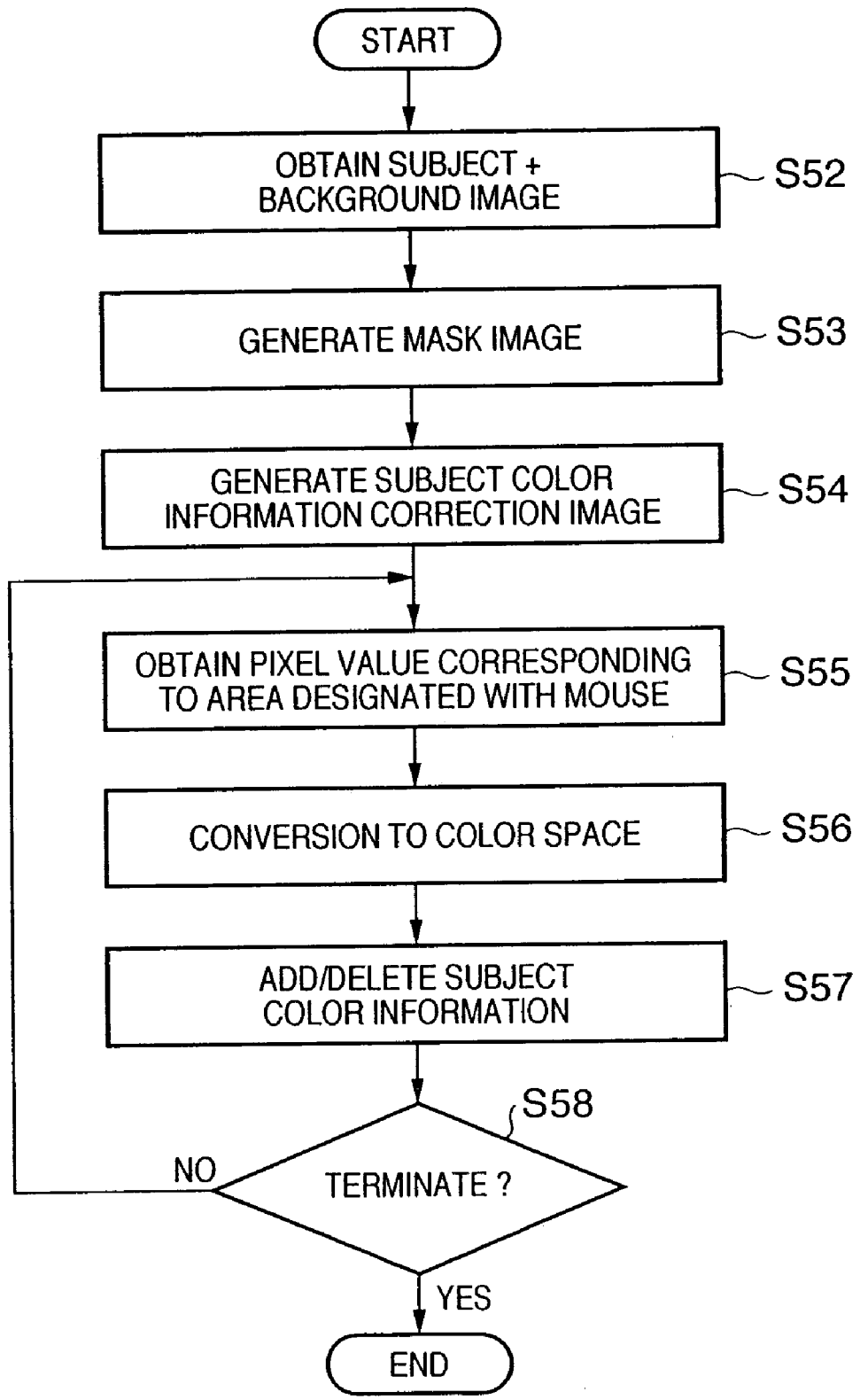
FIG. 14 is a flowchart showing the subject color information correction processing according to the second embodiment.

Next, the subject color information correction processing will be further described with reference to the flowchart of FIG. 14. First, an image including subject and background is obtained from the video camera 101. As the image obtained at this time, an image which will produce noise areas in the background and the subject in a combined image is preferable (step S52). At step S53, a mask image for the subject area is generated from the color information registered in the subject color information registration unit 504 based on the image obtained at step S52. The generated mask image is separated to the subject area and other area (background area), and these areas are respectively colored and superposed on the real image, thereby a subject color information correction image is generated. The generated image is presented to the operator via the GUI (step S54). In the subject color information correction image, as the subject area image is a translucent image, an area of the background image corresponding to the noise area can be checked. This facilitates the operator's filling a noise area.

At step S55, in the subject color information correction image, the area filled by the operator with the mouse cursor, as an area to be registered as a subject color information or an area to be deleted, is obtained via the GUI, and RGB values (r(i,j), g(i,j), b(i,j)) of the real image corresponding to the filled area are obtained. Then at step S56, the RGB values are converted to the YCbCr space as the color space of the subject color space information. At step S57, the YCbCr space coordinates (color information) obtained at step S56 are additionally registered in the subject color information registration unit 504 or deleted from the registered content. The addition/deletion designation may be designated from a menu prior to the filling, as described above. Further, it may be arranged such that, in the mouse, clicking of left button means "additional designation", while clicking of right button means "deletion". Then the operations at steps S55 to S57 are repeated, to sufficiently correct the subject color information. When it is determined at step S58 that an instruction for termination of correction has been made, the process ends.

Note that in the above embodiment, the addition/deletion of subject color information is instructed with clicking of right/left mouse button, however, it may be arranged such that addition is made if an area designated with the mouse is within a subject, while deletion is made if the area is outside the subject.

As described above, according to the present embodiment, subject color information can be easily and automatically registered, from a real image obtained by simultaneously performing image sensing on a background to be the background image of a CG image and on subject(s) to be the foreground of the CG image, and an image only including the subject. Accordingly, even the environment of use of apparatus has been changed, appropriate subject color information can be registered on the spot.

Further, as registered color information can be easily corrected, a combined image with higher precision can be easily presented.

Other Embodiments

Note that in the above respective embodiments, for the simplification and facilitation of understanding, the video combining apparatus has the video camera, the image input unit and the HMD as constituents related to acquisition and registration of subject color information as subject detection information and correction of registered subject color information. However, these constituents are not essential but any other constituents may be employed as long as they enable acquisition and registration of subject color information as subject detection information and correction of registered subject color information.

Further, in the above embodiments, the video combining apparatus has one device, however, the same functions may be realized with a system having plural devices.

Note that the invention can be implemented by supplying a software program, which implements the functions of the foregoing embodiments, directly from a recording medium or indirectly through cable/wireless communication to a system or apparatus capable of executing the program, and then executing the program with a computer of the system or apparatus, thereby attaining the functions.

Accordingly, the program code itself, supplied and installed into the computer to realize the functional processing of the present invention, implements the present invention. That is, the computer program itself to realize the functional processing of the present invention is included in the present invention.

In this case, any form of program such as object code, a program executed by an interpreter, or script data supplied to an OS, may be used as long as it has a program function.

Example of storage media that can be used for supplying the program are a flexible disk, a hard disk, an magnetic recording medium such as a magnetic tape, an MO, a magneto-optical disk such as a CD-ROM, a CD-R, a CD-RW, a magnetic tape, a non-volatile type memory card, a ROM, a DVD-ROM and a DVD-R, and nonvolatile semiconductor memory.

As for the method of supplying the program, the computer program itself constituting the present invention or a data file (program data file) such as an automatically-installable compressed file of the program which can be a computer program constituting the present invention on a client computer can be stored in a server on a computer network, and the program data file can be downloaded to a client computer which accesses the server. In this case, the program data file may be divided into plural segment files and the segment files may be stored in different servers.

That is, the server for downloading the program data file for implementation of the functional processing of the present invention on the computer to plural users is included in the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-341624 filed on Sep. 30, 2003, and Japanese Patent Application No. 2004-037188 filed on Feb. 13, 2004, which are hereby incorporated by reference herein.

What is claimed is:

1. An image combining method for a display apparatus for combining a real image obtained by image sensing real space with a computer-generated image, and for displaying a combined image, comprising:
    using a display apparatus to perform the steps of:
    a real image acquisition step of acquiring a first real image including an object to be a subject of a mask area, and of acquiring a second real image not including the object;
    a determination step of determining colors which exist in the first real image and do not exist in the second real image;
    a definition step of defining a closed area in a color space by connecting with an outside line a group of points indicating the determined colors in the color space and interpolating colors inside the connected line;
    an extraction step of extracting an area, whose color is included in the determined and interpolated colors in the closed area defined at said definition step, as a mask area from said real image; and
    a combining step of combining said real image with said computer-generated image by using said mask area extracted at said extraction step.

2. The image combining method according to claim 1, wherein the color determined at said determination step is represented with color coordinate information in color space constructed with luminance coordinate information and color coordinate information.

3. The image combining method according to claim 1, wherein at said extraction step, regarding each mask area extracted from said real image based on the color determined at said determination step, it is determined whether or not the mask area is noise, and an area determined as noise is changed to an area other than the mask area.

4. The image combining method according to claim 3, wherein at said extraction step, if the area of extracted mask area is smaller than a predetermined value, the mask area is determined as noise.

5. The image combining method according to claim 3, wherein at said extraction step, extracted mask areas are sorted in area size order, and a mask area in a predetermined place from the largest mask area and subsequent smaller mask areas are determined as noise.

6. The image combining method according to claim 1, wherein at said extraction step, regarding each area other than the mask area extracted from said real image based on the mask area, it is determined whether or not it is noise, and an area determined as noise is changed to a mask area.

7. The image combining method according to claim 6, wherein at said extraction step, if the area other than the extracted mask area is smaller than a predetermined value, the area is determined as noise.

8. The image combining method according to claim 6, wherein at said extraction step, extracted areas other than the mask area are sorted in area size order, and an area in a predetermined place from the largest area and subsequent smaller areas are determined as noise.

9. The image combining method according to claim 1, further comprising:
    a presentation step of generating a subject area image where the mask area extracted at said extraction step and an area other than the mask area are represented in visually different manners, and presenting a correction image obtained by superposing the subject area image, as a translucent image, over said real image, via a user interface; and
    an update step of generating color information of mask area to be added/deleted to/from color information of an area of said real image corresponding to an area of said correction image designated via said user interface, and updating the currently-registered mask area color information.

10. The image combining method according to claim 9, wherein in said subject area image, said predetermined subject area and said other area than said subject area have different colors.

11. An image combining apparatus which combines a real image obtained by image sensing real space with a computer-generated image, and which displays the combined image, comprising:
    a real image acquisition unit configured to acquire a first real image including an object to be a subject of a mask area, and to acquire a second real image not including the object;
    a determination unit configured to determine colors which exists in the first real image and do not exist in the second image;
    a definition unit to define a closed area in a color space by connecting with an outside line a group of points indicating the determined colors in the color space and interpolating colors inside the connected line;
    an extraction unit configured to extract an area, whose color is included in the determined and interpolated colors in the closed area defined by said definition unit, as a mask area from said real image; and
    a combining unit configured to combine said real image with said computer-generated image by using said mask area extracted by said extraction unit.

12. A computer program stored on a computer readable medium for use by a computer to perform the respective steps of the image combining method according to claim 1.

13. A computer-readable memory storing a computer program of instructions which, when executed by a computer processing system, causes the system to perform the image combining method according to claim 1.

* * * * *